United States Patent [19]

Urban et al.

[11] Patent Number: 4,674,107
[45] Date of Patent: Jun. 16, 1987

[54] DISPLAY FOR RADIATION IMAGING

[75] Inventors: Carol A. Urban, Euclid; Mangala A. Morey, Cleveland Heights, both of Ohio

[73] Assignee: Picker International, Inc., Cleveland, Ohio

[21] Appl. No.: 761,054

[22] Filed: Jul. 31, 1985

[51] Int. Cl.⁴ .............................................. H05G 1/64
[52] U.S. Cl. ....................................... 378/98; 378/99; 378/209; 378/195; 358/111
[58] Field of Search ................. 378/98, 177, 179, 208, 378/209, 195; 358/103, 107, 189–192, 99

[56] References Cited

U.S. PATENT DOCUMENTS

| | | |
|---|---|---|
| 2,259,036 | 10/1941 | Goldfield et al. . |
| 2,567,363 | 9/1951 | Blatz . |
| 2,812,687 | 11/1957 | Eitel, Jr. et al. . |
| 2,972,681 | 2/1961 | Lusby et al. . |
| 3,018,375 | 1/1962 | Graves et al. . |
| 3,702,935 | 11/1972 | Carey et al. ......................... 378/195 |
| 3,916,203 | 10/1975 | Norgren . |
| 3,950,648 | 4/1976 | Martone et al. . |
| 4,014,207 | 3/1977 | Meyer et al. . |
| 4,190,774 | 2/1980 | Marinkovich et al. ............. 378/177 |
| 4,197,465 | 4/1980 | Schneider . |
| 4,271,476 | 6/1981 | Lotspiech ............................ 358/140 |
| 4,357,538 | 11/1982 | Hunt et al. . |

OTHER PUBLICATIONS

Picker International Product Brochure for the Vector-R&F System Dare?.

Primary Examiner—Craig E. Church
Assistant Examiner—John C. Freeman
Attorney, Agent, or Firm—Timothy B. Gurin

[57] ABSTRACT

A radiographic/fluoroscopic X-ray system is disclosed employing a new and improved method and apparatus for viewing an image of a subject under examination. The system includes a flat panel display screen integrally mounted to the spotfilmer/imaging system housing. The display screen is mounted to the spotfilmer/imaging system housing to provide pivotal movement in at least one direction. Where a tiltable X-ray table is used, apparatus and circuitry is provided to maintain correct viewing orientation of the image with respect to the operator while the table is tilted throughout its range.

19 Claims, 10 Drawing Figures

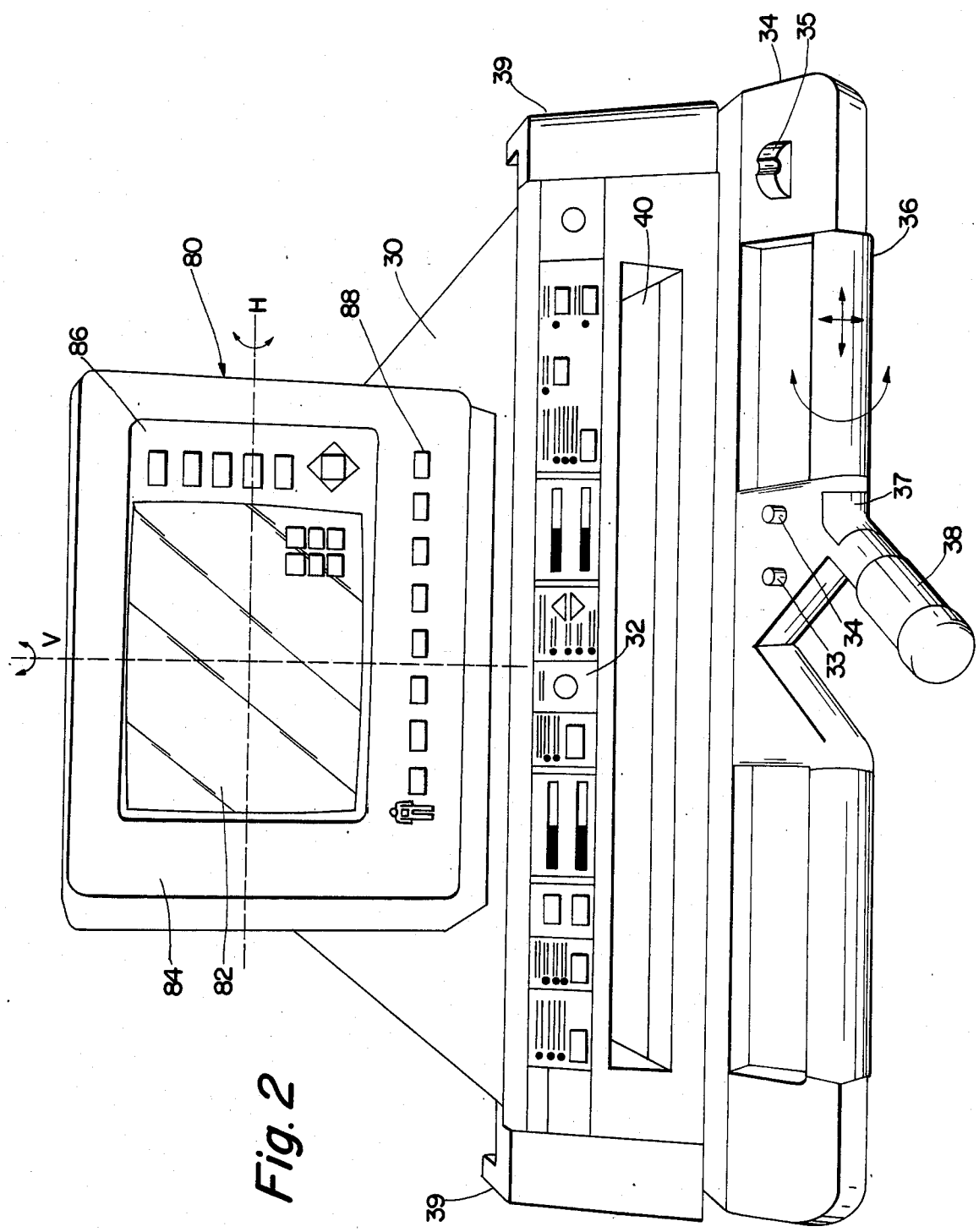

DISPLAY FOR RADIATION IMAGING

TECHNICAL FIELD

This invention relates generally to the field of radiation imaging, and more particularly to medical diagnostic radiography employing a new and improved method and apparatus for displaying an image of a subject under examination.

BACKGROUND ART

Conventional radiographic and fluoroscopic (R&F) X-ray systems usually comprise a tiltable X-ray table upon which a subject under examination is placed, an imaging system used to convert the X-radiation into visible light images, a viewing device used to display the light images and a spotfilmer used for making a film record of the viewed image.

In tiltable type X-ray tables a flat topped elongated table body is pivotally connected to a base or pedestal so that it can be tilted in either direction from its normal position in which the patient-supporting top surface is horizontal. The table body pivots about an axis parallel to its top and perpendicular to its length. In so-called 90/90 tables, the table body is tiltable in either direction 90° from the horizontal. The tilting permits examination of the patient in any angular position between these two extremes. Other tables have a body which is tiltable in one direction from the horizontal to a vertical position and in the other direction to a so-called Trendelenburg position wherein the angle of the table top is angularly placed approximately 15° past the horizontal. X-ray tables of this type are well known.

Such tables typically include a tower assembly which is movably carried by the table body. The tower assembly is carried by a carriage in a path transverse to the longitudinal extent of the table body. The carriage is longitudinally movable relative to the table body along two rails mounted in the table body. The X-ray source is mounted to the carriage and is housed in the table body. The tower assembly movably supports radiation sensing devices such as a spotfilmer and imaging system. The radiation sensing devices are movable with respect to the tower assembly in a vertical direction. The imaging system typically includes an image intensifier tube and associated cameras for viewing the image intensifier tube output. In other prior art systems a fluoroscopic screen may be used in lieu of the imaging system.

The spotfilmer is commonly supported by the tower assembly in spaced relation above a patient examining surface defined by the X-ray table top and in alignment with the X-ray source. The combination of the carriage and tower assembly permit the spotfilmer to move in the transverse, longitudinal and vertical directions with respect to the table body. The X-ray source is mounted to the carriage such that the longitudinal alignment of the source with the radiation sensing devices is maintained during movement along the entire table body length. An example of one such tiltable X-ray table can be found in U.S. Pat. No. 4,197,465 issued to Schneider and owned by the present assignee and which is expressly incorporated herein by reference.

The three rectilinear paths of travel permit the spotfilmer/imaging system combination to be moved to any selected position over the table top and to any selected distance from the top within the limits of the respective paths of travel.

Since the movement of the spotfilmer/imaging system combination relative to the tower is vertical when the table top is horizontal, counterbalancing weights are carried in the tower to facilitate the vertical movement of the spotfilmer.

Since the spotfilmer/imaging system combination is movable in a vertical path when the table top is in a vertical position, weights to counterbalance the combination are provided in the table body.

In a prior art counterbalancing system, for every one pound of spotfilmer/imaging system weight, an additional 1½ pounds of counterbalance weight is required. An example of one such counterbalancing system can be found in U.S. Pat. No. 3,916,203 issued to Norgren and owned by the present assignee and which is hereby expressly incorporated by reference.

Prior art spotfilmers generally include a cassette carriage assembly movably supported within the spotfilmer housing. The cassette carriage assembly serves as a means for supporting and conveying an X-ray film cassette to one of a plurality of positions within the housing. The housing also supports an operator control and function display panel which is mounted across the front of the spotfilmer. One or more operating handles are also provided to manually move the spotfilmer in the longitudinal, vertical and transverse directions with respect to the patient support and alternatively may include one or more sensors for activating a power drive system to facilitate the positioning of the spotfilmer by the operator. The control and function display panel include a plurality of indicators and soft touch push-buttons. The indicators inform the operator of the status of various spotfilmer functions and formats. The pushbuttons are used for selecting film formats, film cassette positioning, table base and top movements, exposure initiation, X-ray field size and various other spotfilmer functions. An example of one such spotfilmer can be found in U.S. Pat. No. 4,357,538 issued to Hunt et al. and owned by the present assignee and which is hereby expressly incorporated by reference.

As noted above, R&F systems are operated in either a fluoroscopic or radiographic mode. In the fluoroscopic mode the spotfilmer and the associated imaging system is positioned over the patient and the X-ray source is energized. X-rays propogate along a path traversing the patient support and penetrate the patient. Radiation emerging from the patient impinge upon a radiation sensor. Such sensor may include a fluoroscopic screen mounted to the spotfilmer housing or, more typically, upon an image intensifier tube mounted on top of the spotfilmer housing in alignment with the X-ray source. The image intensifier tube is either coupled to a mirror optics system (described in more detail below) which permits direct viewing of the output of the image intensifier tube or is coupled through a television camera to a CRT display monitor which translates the impinging X-ray pattern into a video image. An example of one such imaging system can be found in U.S. Pat. No. 4,193,089 issued to Brougham et al. and owned by the present assignee which is hereby expressly incorporated by reference.

If the operator desires a film record of the area being examined and viewed fluoroscopically, a radiographic mode is selected. In this mode, a film cassette is positioned within the spotfilmer housing in alignment with the patient area being examined. The X-ray source is then energized to expose the X-ray film.

In prior art R&F systems which utilize a CRT display monitor, the monitor and associated electronics is of such size and weight that it is mounted and enclosed in its own housing assembly. In order to provide flexibility in positioning, the monitor assembly is mounted on movable support means such as roll cart or an overhead support assembly. These mounting means allow the display to be brought in relative close proximity to the table without interfering with table movements, patient positioning or movement of attending personnel. As such, the monitor is usually off to one side of the table base and positioned some distance away from one viewing the image displayed on the CRT. The placement of the monitor in this fashion forces the operator to divide his or her attention between the patient under examination, spotfilmer controls, function displays and the monitor thereby reducing operation efficiency and causing operator inconvenience.

Mounting the CRT display for movement along with the spotfilmer/imaging system combination while possible, has been impracticable due to their excessive size and weight. A conventional CRT requires 14"–19" in depth for mounting and weigh 17–25 pounds. With the image intensifier tube and associated cameras mounted on the spotfilmer, the depth dimension of the CRT would require mounting in such a fashion that the front face would be hyperextended beyond the control deck of the spotfilmer. Twenty-five to thirty-seven (25–37) pounds of additional counterweights would also be required to offset the added weight of the CRT. The added weight would place additional stress on the tower assembly and would reduce the maneuverability of the spotfilmer.

The prior art systems employing a fluoroscopic screen as the viewing device suffer from disadvantages in that the screen must be mounted perpendicular to the central axis of the X-ray beam. Since the perpendicularity must be maintained for proper image focus, the screen cannot be adjusted for a comfortable viewing position. Mounting in this manner presents a practical limitation to viewing the patient under examination in that the patient must be in an upright or vertical position in order for the radiologist to see the image in its proper orientation. In order to adequately view a fluoroscopic screen image, the room lighting must be subdued so that one viewing the image can become "dark adapted." The radiation intensities required for this type of system are also higher.

A mirror optics viewing system may be mounted to the spotfilmer housing and in optical alignment with the output of the image intensifier tube thus eliminating the television camera and associated monitor. Through a series of mirrors and lenses the image produced at the output of the image intensifier tube is magnified, focused and reflected onto a viewing mirror which is adjustable for the convenience of the operator. An example of one such mirror optics viewing system can be found in U.S. Pat. No. 3,018,375 issued to Graves et al. and owned by the present assignee and is hereby expressly incorporated by reference. A disadvantage to such a system is that the viewed image is minified in relation to the object under examination. Further, the image must be viewed in a darkened room and only one person can conveniently view the image at a time. Also, due to the limited field of view of the optics chain, the person viewing the image must keep his or her line of sight substantially stationary. In systems that employ radiation control means known as Automatic Brightness Control, the mirror optic viewing system suffers a further disadvantage in that variations in room lighting may be fed back into the brightness control and may cause variation in radiation intensity.

The present invention contemplates a new and improved display for radiation imaging which overcomes the above referenced problems and disadvantages.

SUMMARY OF THE INVENTION

In accordance with a first aspect of the present invention, an image display apparatus is provided for X-ray diagnostic imaging. A patient support member is mounted to a main support structure. A source for propogating penetrative radiation along a path extending through the patient support member is mounted at a location spaced from a first side of the support member. A radiation sensor is mounted for imposition in the radiation path at a location spaced from a second side of the support member. The radiation sensor produces electrical signals representing the pattern of radiation incident thereon. An image display responsive to the electrical signal produced by the radiation sensor is electrically coupled to and positioned proximate to the sensor.

In accordance with a more limited aspect of the present invention, the patient support member is mounted for tilting motion with respect to the main support structure, about a first axis. The image display is mounted for movement with the patient support member about the first axis.

In accordance with a more limited aspect of the present invention, the image display is mounted for pivotal motion about a second axis. A further limitation is provided wherein the image display is mounted for pivotal motion about a third axis orthogonal to the second axis.

In accordance with another aspect of the present invention, means are provided to cause rotation of the image in response to the tilting motion of the patient support member. A motion sensor is operatively coupled to the radiation sensor for generating a position signal which is a function of the direction and extent of the radiation sensor motion. A display memory comprising an array of data storage locations is coupled to the radiation sensor and the image display for storing a set of radiation representing electric signals. Circuitry coupled to the display memory and responsive to the position signal generated by the motion sensing means arranges the set of radiation representing signals stored in the array into a first mapping. The circuitry also rearranges the set of radiation representing electrical signals stored in the array to a second mapping in response to changes in the position signal. A control logic repeatedly accesses the display memory and transmits the radiation representing signals to the image display.

In accordance with yet another aspect of the present invention, a method of maintaining orientation of an image of a subject produced on a display during pivotal motion of a support member with respect to a main support frame is provided. A source of penetrative radiation is actuated to irradiate a subject under examination. Radiation emergent from the subject under examination is sensed and electrical signals representing the sensed radiation is produced. The radiation representing signals are displayed as a visual image. Upon pivotal motion of the support member, the displayed image is rotated as a function of the direction and extent of the pivotal motion. Rotation occurs by storing the radiation representing signals in a plurality of first memory locations. The direction and extent of the pivotal motion of the patient support member is determined. The memory locations of the radiation representing signals are then relocated to a plurality of second memory locations, the second location being a function of the angle of the patient support member. In accordance with a more limited aspect of this method the radiation representing signals are relocated by identifying the coordinate location of each of the plurality of first memory locations. The sine and cosine values of the angle representing the position of the patient support member is determined. The coordinate locations of each of the plurality of second memory locations is then determined by applying the sine and cosine values of the angle to the coordinate location of each of the plurality of first memory locations. The memory locations are periodically accessed and the radiation representing signals stored therein transmitted to the display.

One advantage of the present invention is to provide a fluoroscopic image viewing system which overcomes the disadvantages of prior art by mounting an image display screen in close proximity to the radiation sensing apparatus and controls.

Another advantage of the present invention is to provide a fluoroscopic image viewing system wherein the viewing apparatus is positionable such that the viewing comfort of the operator is enhanced.

Yet another advantage of the present invention is to provide a viewing system which is mounted for movement with the radiation sensing apparatus and which maintains proper image orientation with respect to one viewing the image as the table is tilted through its entire range.

Additional advantages of the present invention will be obtained in reading and understanding the following detailed description of the preferred embodiment made in connection with the accompanying drawings.

BRIEF DESCRIPTION OF THE DRAWINGS

FIG. 2 is a front perspective view of the fluoroscopic image display screen and its associated hardware.

BEST MODE FOR CARRYING OUT THE INVENTION

Figure 1:
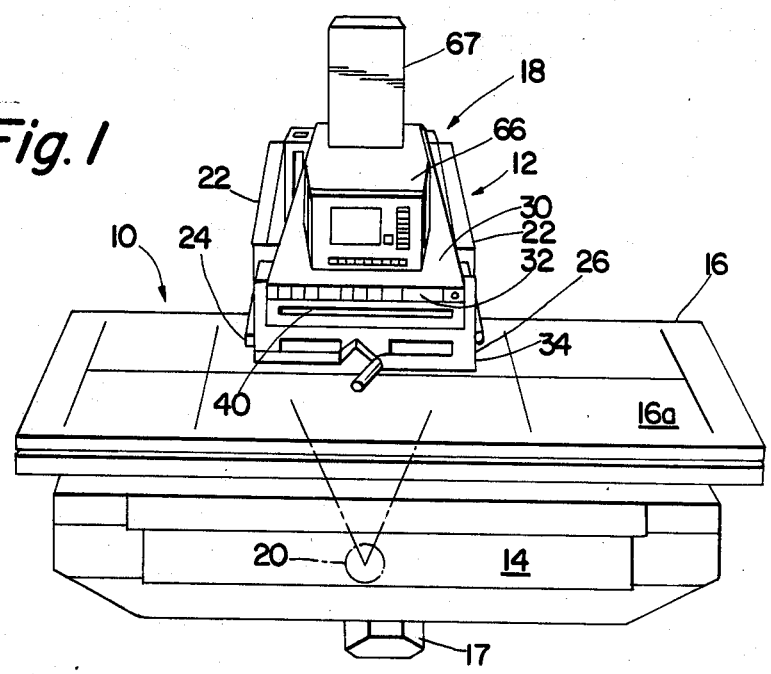
FIG. 1 is a perspective view of an X-ray apparatus that includes a fluoroscopic imaging apparatus constructed in accordance with the preferred embodiment of the invention.

FIG. 1 illustrates the overall construction of a medical X-ray apparatus that includes a patient support member or table 10 and a spotfilmer 12 constructed in accordance with a preferred embodiment of the invention. The table 10 includes a table body 14 and a movable table top 16 that defines a planar patient examining surface 16a. The table body 14 is rotatably supported by a main support structure or pedestal, a portion of which is indicated by the reference character 17 and is rotatable about an axis defined by the pedestal 17 between horizontal and vertical positions. The table top 16 is supported for longitudinal and transverse movement with respect to the table body 14 in a conventional way.

The spotfilmer 12 is supported above the patient examining surface 16a by a vertical tower 18. The tower is supported for movement along the table body 14 by a tower support carriage (not shown). A conventional X-ray source 20 (indicated schematically) comprising an X-ray tube and collimator (not shown) is located within the table body 14 and is mounted to the tower carriage. The X-ray source 20, tower 18 and the spotfilmer 12 move as a unit and thus the longitudinal alignment between the spotfilmer 12 and the X-ray source 20 is maintained regardless of spotfilmer position.

The spotfilmer 12 is attached to the tower 18 by a support frame that includes a pair of transversely extending arms 22. The arms 22 are vertically movable (as viewed in FIG. 1) with respect to the tower 18 and provide a means for adjusting the height of the spotfilmer above the patient examining surface 16a. The spotfilmer 12 is slidably attached to the arms 22 by support rails 24, 26 that extend along the sides of the spotfilmer. In the preferred embodiment, the rail 24 is rectangular in cross-section and is slidably engaged and vertically supported by a longitudinal slot (not shown) formed in the left arm 22. The rail 26 is circular in cross section and is both vertically and laterally supported by a complementary shaped slot (not shown) formed in the right arm 22.

When the support arms 22 are raised to their uppermost position so that the bottom surface of the spotfilmer is above the top end of the tower 18, the spotfilmer 12 is slidable between a non-operative position wherein the spotfilmer is positioned to the rear of the X-ray table 10 and an operative position wherein the spotfilmer 12 overhangs the patient examining surface 16a (as seen in FIG. 1).

Image intensifier tube assembly 66 with associated television camera 67 is mounted on the spotfilmer housing 30. The output of the image intensifier tube is optically coupled to the input of a closed-circuit television camera preferably of the lead oxide type which converts the light image to an analog video signal representative of the light image.

Referring also to FIG. 2, the spotfilmer includes a metal exterior housing 30 that forms at least a portion of the supporting frame structure for the spotfilmer. A molded operator control and function display panel 32 is mounted across the front of the spotfilmer. Film cassette receiving openings 40, 42 (see FIG. 3) are defined by the spotfilmer housing 30. Integral to the housing and below the film cassette receiving opening 40 is the operating handle assembly 34. The handle assembly 34 projects outward from the panel 32 and is canted downward from the horizontal plane. The handle assembly 34 consists of control handles 36, 38 which are grasped by the operator to manually move the spotfilmer 12 in the longitudinal, vertical and transverse directions with respect to the table 14. The control handles 36, 38 include known strain gauge sensors which activate a power drive system to facilitate the positioning of the spotfilmer by the operator. For example, rotating handle 36 activates power assist in moving the spotfilmer in the transverse direction. Applying an upward or downward pressure on handle 36 activates power assist to move the spotfilmer in a vertical direction. Likewise, applying lateral pressure to the handle 36 activates power assist for longitudinal movement of the spotfilmer. Handles 36 and 38 are disposed approximately 135° from one another to facilitate movement of the spotfilmer by either left handed or right handed individuals. Exposure initiation switch 37 is placed conveniently between the handles 36, 38 for exposure initiation without the operator removing their hands from the control handles. Side handles 39 are provided for convenience in the movement of the spotfilmer. Four way toggle switches 33, 34 respectively provide for adjustment of the tabletop 16 in the transverse and longitudinal direction and for manual adjustment of the X-ray beam collimator assembly located in the table base (not shown). Rocker switch 35 controls table tilt motion. A rear access door 46 (shown in FIG. 3) normally covers the cassette receiving opening 42, allowing access to the interior of the spotfilmer housing 30 only when a rear load mode has been selected by the operator.

A conventional palpitator cone 50 is slidably mounted to the bottom of the spotfilmer housing 30. A drive system is activated from control panel 32 to drive the cone between operative and retracted positions.

Figure 3:
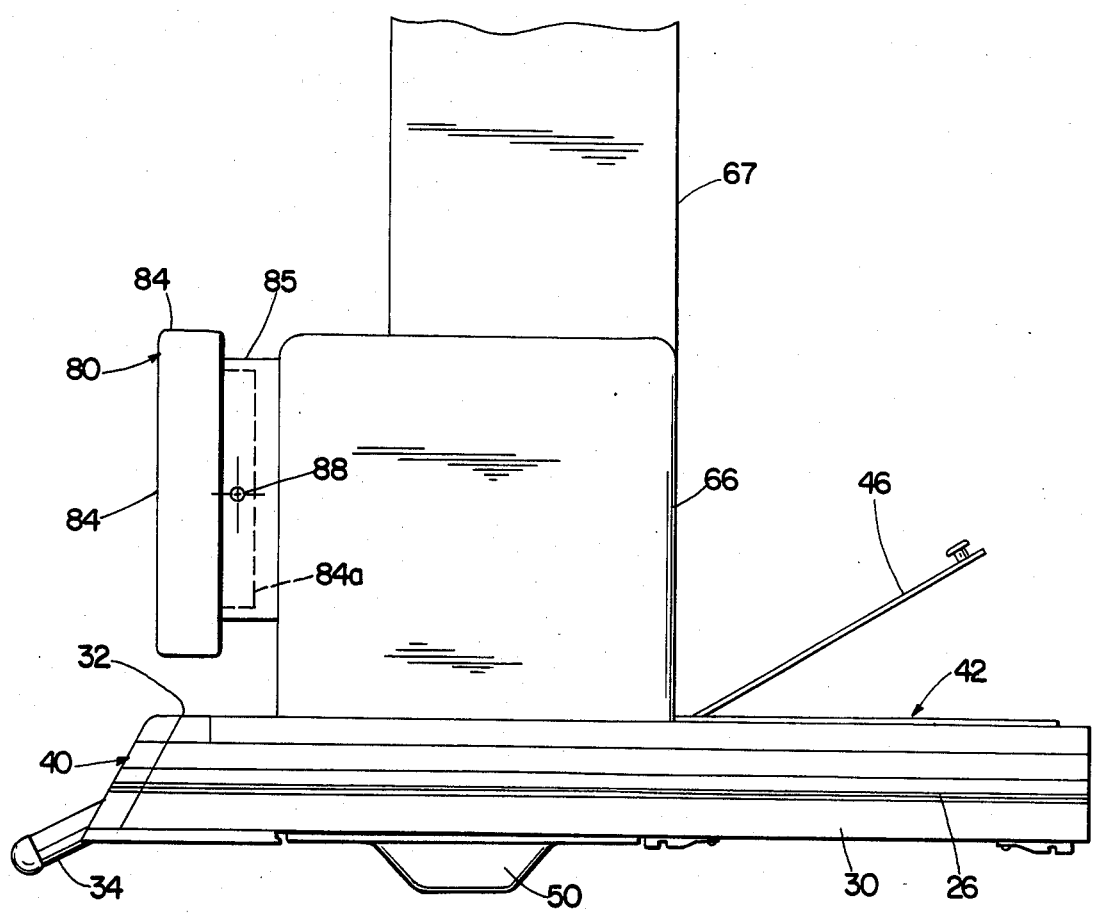
FIG. 3 is a side elevational view of the spotfilmer/imaging system housing.
Figure 4:
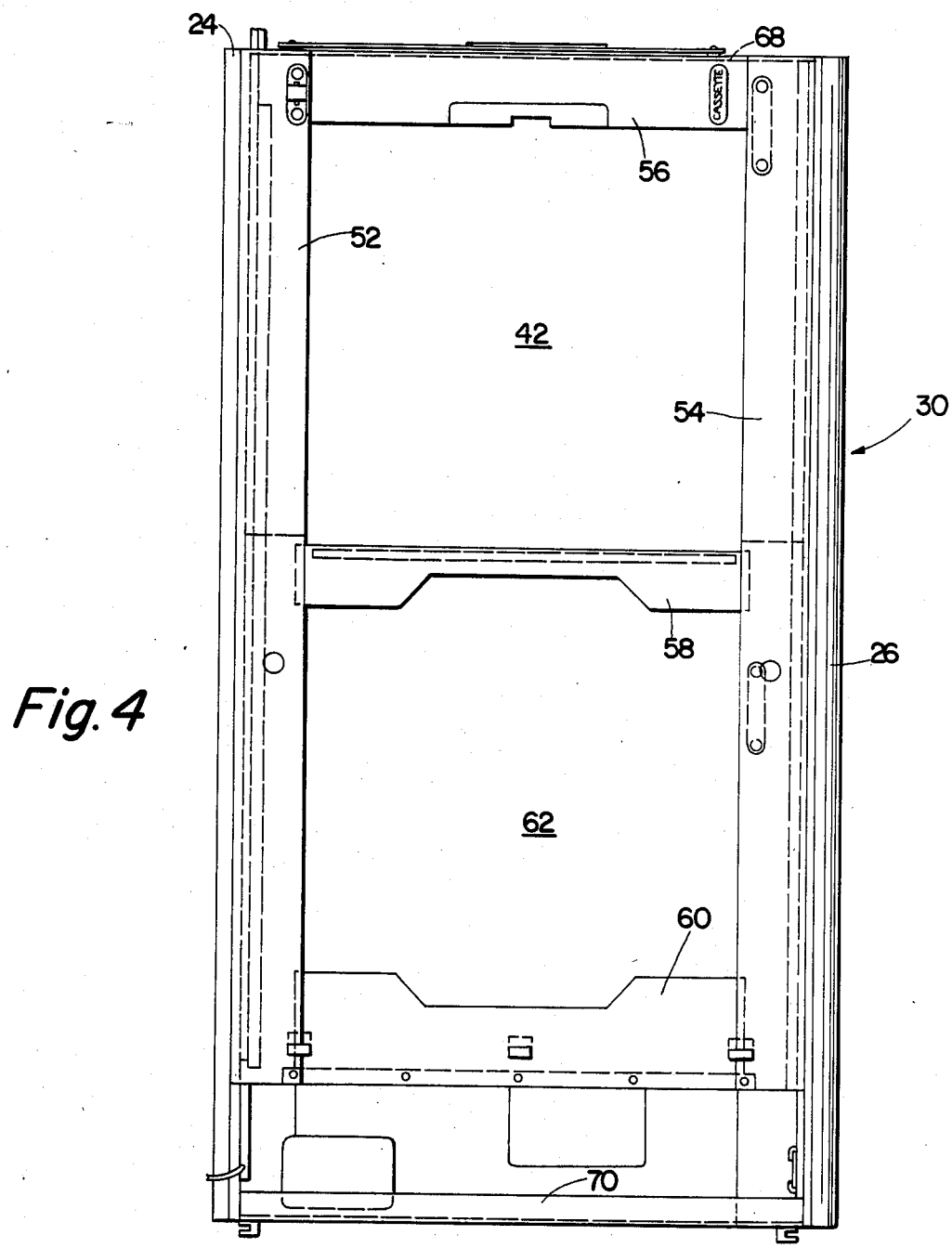
FIG. 4 is a top plan view of the spotfilmer housing.

Referring to FIGS. 3 and 4, the spotfilmer housing 30 is preferably a weldment and includes a pair of extruded aluminum U-shaped channels 52, 54 that form side plates. Aluminum tie plates 56, 58, and 60 are butt welded between the upper legs of the U-channels 52, 54 at spaced locations along their longitudinal extent. Additional tie plates (not shown) are butt welded between the lower legs of the U-channels 52, 54 at the front and rear of the housing, respectively.

As seen in FIG. 4, the side channels 52, 54 and the tie plates 56, 58 define the rear cassette receiving opening 42 in the spotfilmer housing 30. The channels 52, 54 together with the middle and front tie plates 58, 60 respectively define an opening 62 that is in alignment with the axis of the X-ray source when the spotfilmer 12 is in its operative position. In use, an image intensifying tube assembly 66 with associated camera 67 (shown in FIG. 1) is mounted over the opening 62.

A rear plate 68 is fastened across the back of the filmer housing 30 to provide added rigidity. An L-shaped angle member 70 is similarly fastened across the front of the filmer housing and provides the same function. The housing support rails 24, 26 are preferably constructed of steel and are suitably fastened to the respective U-channels 52, 54.

Mounted in front of the image intensifier tube assembly 66 is the display screen assembly 80. In the preferred embodiment, the display screen 82 is of the flat panel type and can be either a plasma gas discharge panel (SAI Technology 5000 or 7000 series Plasmascope); electroluminescent panel (available from Planar Systems, Inc. or Finilux, Inc.) or a liquid crystal panel. These panel type display screens are preferred due to their light weight, minimal depth dimension and low power consumption.

Referring in particular to FIG. 2, the display assembly 80 is comprised of a flat panel display screen 82 mounted in enclosure 84. The enclosure 84 provides in part for a control deck 86 which controls various imaging system functions. In prior art systems these controls were normally found on the front face of the imaging system housing. An additional control deck 88 provides controls for spotfilm format and size selection.

The display screen assembly 80 is pivotally mounted to the image intensifier tube assembly 66 to provide tilting movement of the display assembly 80 about two axis identified respectively as V and H in FIG. 2.

Figure 5:
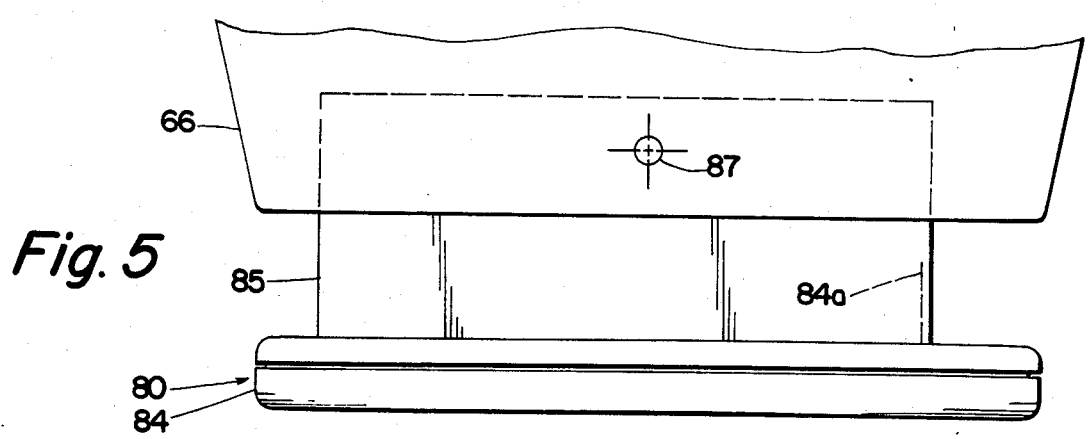
FIG. 5 is a top plan view of the image display screen and its associated mounting apparatus.

Referring to FIG. 5, the manner in which the display assembly 80 is pivotally mounted is shown in more detail. Extending from the enclosure 84 is shroud 85 extending into the image intensifier tube assembly 66. The display assembly 80 is movably mounted to image intensifier tube assembly 66 via shroud 85 through a tight friction fit at pivot point 87 which defines axis V shown in FIG. 2.

Pivotal mounting in the H axis is shown in more detail in FIG. 3. Flange 84a which is rigidly mounted to enclosure 84 extends into shroud 85. The display assembly 80 by virtue of flange 84a is movably mounted to shroud 85 through a second tight friction fit at pivot point 88 which defines axis H shown in FIG. 2.

Figure 6:
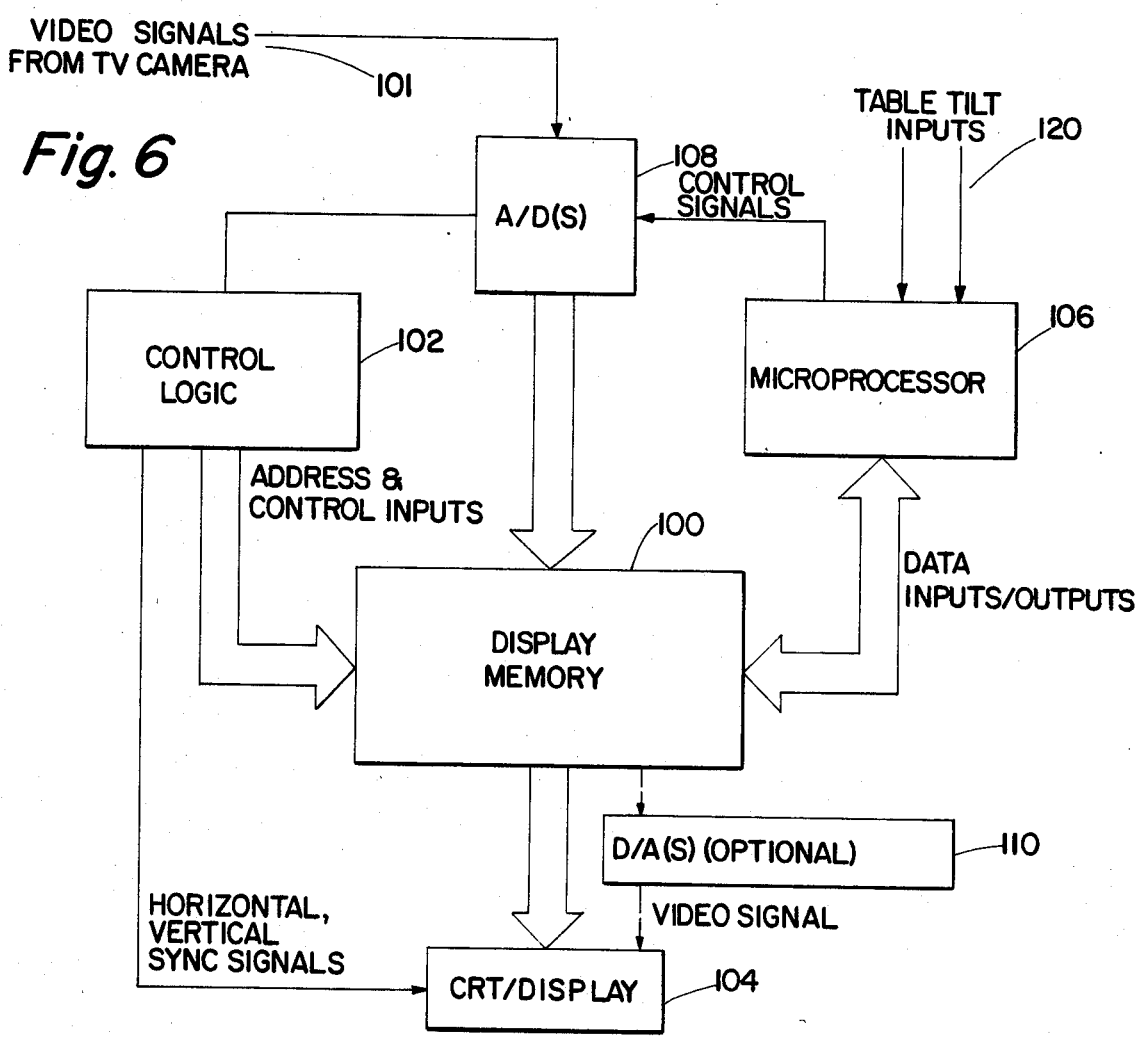
FIG. 6 is a block diagram of the image orientation control system.

Referring to FIG. 6, a block diagram of the image orientation control system is shown. The analog to digital converters 108, under the control of the microprocessor 106 convert the analog video signals 101 from the TV camera into corresponding digital words (bytes) which represent pixel elements of varying intensity that compose the image of the subject under examination. The word size is typically 8 bits for monochrome which will allow for $2^8$ or 256 shades of grey. For color images the typical word size is 12 bits which is subdivided into 3 segments each representing a color, e.g., blue, red and green. Each color is afforded $2^4$ or 16 levels of intensity. Longer word lengths will permit an increase in the intensity scale at the expense of increased memory size. A set of digital words or bytes which comprise an image are stored in the display memory 100. For a 512×512 pixel display, the display memory would consist of one bank of eight 256k×1 dynamics RAM's available from Mostek.

Figure 7:
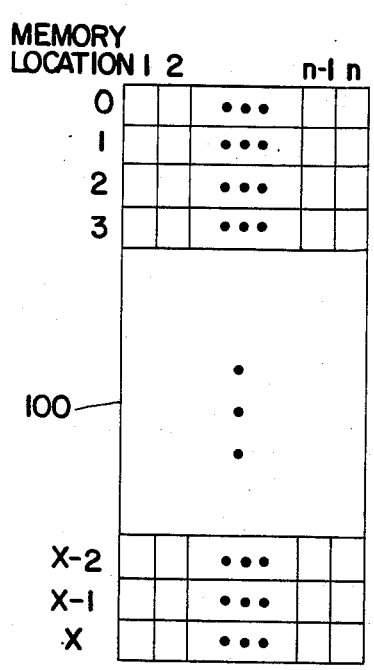
FIG. 7 is a schematic representation of the display memory.
Figure 8:
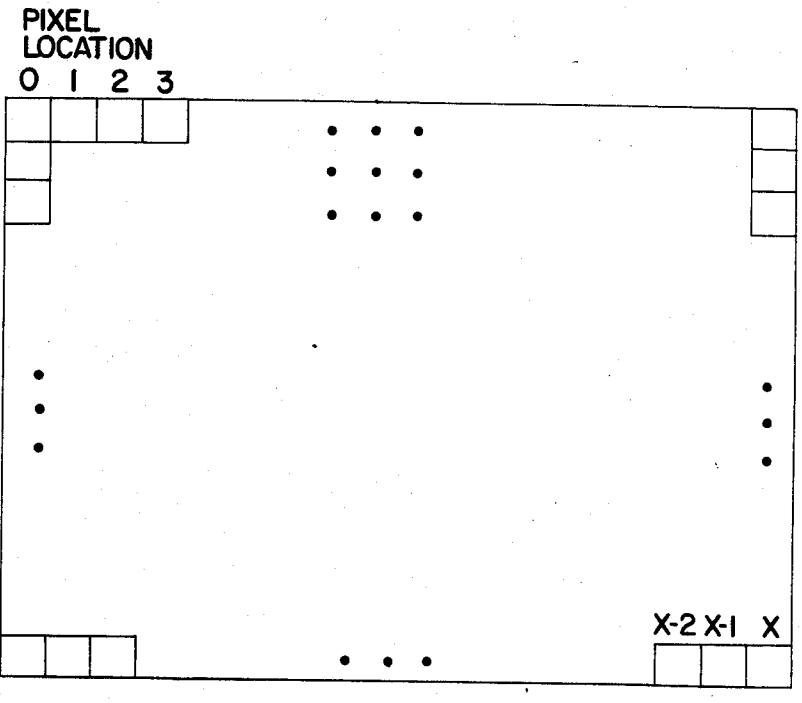
FIG. 8 is a schematic representation of display screen pixel configuration.

An individual byte is stored in the display memory 100 in a memory location corresponding to its respective pixel location on the display 82. The memory location or address is assigned via microprocessor 106. Referring to FIGS. 7 and 8 the relationship between the display memory 100 and the display screen 82 is shown. Memory locations in the display memory 100 are identified by the numbers 0 through X shown vertically in FIG. 7. In the case of a 512×512 pixel display, 262,144 bytes or memory are required, i.e. X=262,144. Shown horizontally is the number of bits (1 through n) which define a digital word or byte per memory location. The digital word defines the intensity level of the particular pixel.

FIG. 8 shows the pixel configuration of the display 82. The pixel locations 0 through X on the display 82 correspond directly to the memory location 0 through X in the display memory 100. For example, the content of memory location zero of the display memory 100 is displayed at pixel location zero on the viewing screen 82. Similarly, the content of memory locations 1, 2, . . . , X-1, X are displayed in pixel locations 1, 2, . . . , X-1, X respectively.

Once stored in the display memory 100, the control logic 102 accesses the display memory 100 and outputs the data to the display 104. The digital word stored in a given memory location is then displayed on the screen in the appropriate location as an intensity level. If the type of display chosen utilizes analog video signals instead of digital data, then the digital data from the display memory is input to a D/A converter 110. The analog output is then fed directly to the analog display.

Microprocessor 106 is preferably a 16-bit Motorola MC68000L12, operating at 12.5 MHz. clock rate. The MC68000L12 microprocessor has 32-bit data and address registers, and 56 powerful instruction types such as multiplication and division, which will be especially useful in calculations for image rotation (described in more detail below).

The control logic 102 is a Memory Management Unit (MMU), preferably a Motorola MC68451, a set of counters and other logic gates, latches and flip-flops. The MC68451, (MMU), is compatible with the MC68000L12 microprocessor and provides efficient memory allocation using function codes that specify data and program space. The control logic 102 under the direction of the microprocessor, 106 provides the addresses of the display memory 100 to input the digital data from the digital to analog converters and access the display memory to output the data from the display memory to the display. The set of counters and other logic gates provide to the display horizontal and vertical sync signals which synchronize the access of the display memory with the horizontal and vertical scanning of the Display.

Figure 9:
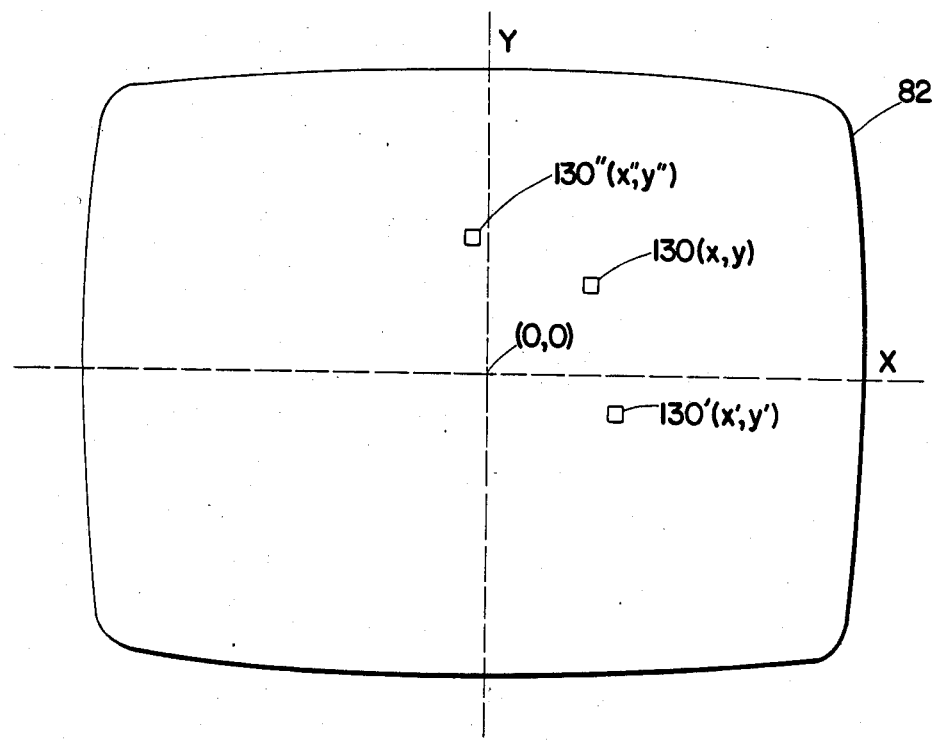
FIG. 9 is a schematic representation of the display screen.
Figure 10:
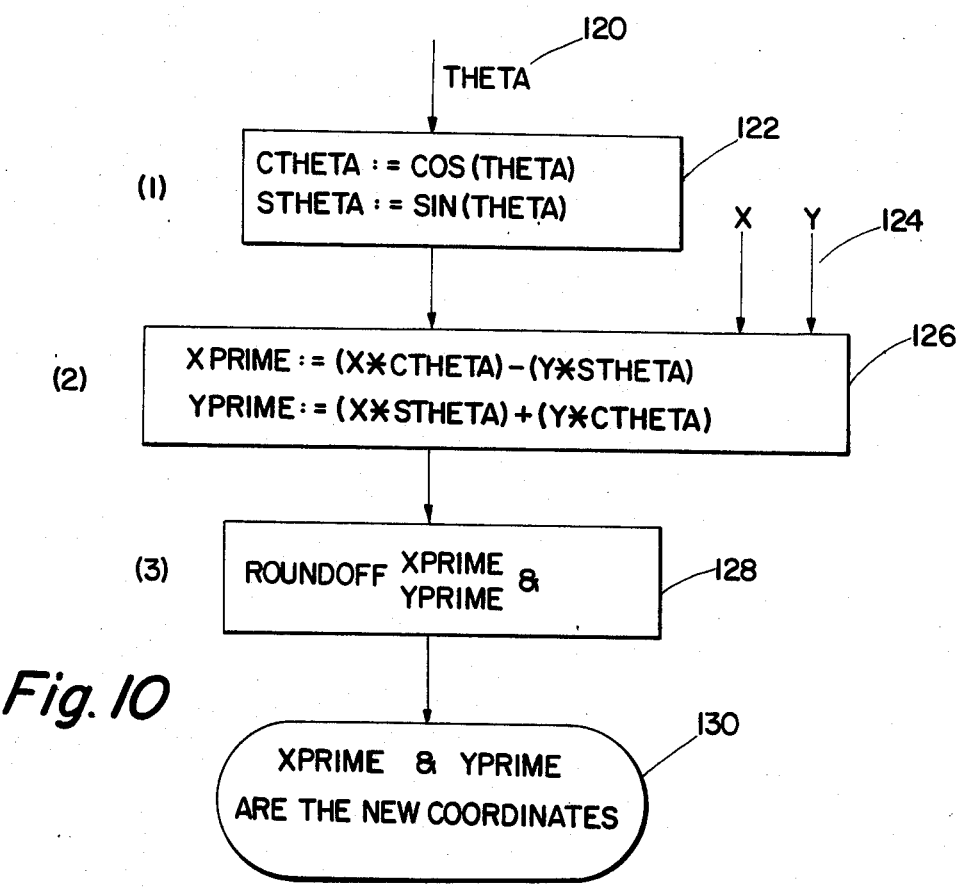
FIG. 10 is a flow diagram of the steps to calculate pixel coordinate locations.

Referring now to FIGS. 9 and 10 the process by which the digital information retained in the display memory is rearranged in synchronism with changes in angular position of the table base in order to maintain proper image orientation with the one viewing the image is described. As explained earlier, the full extent of table tilt, $\theta_{(T)}$ falls within the range $-90° \leq \theta_{(T)} \leq 90°$ from the horizontal. The extent of table tilt in the Trendelenburg position (patient head down) falls within the range $0° \leq \theta_{(T)} \leq 90°$ while the range of tilt in the vertical position (patient head up) is $-90° \leq \theta_{(T)} \leq 0°$.

FIG. 9 is a schematic representation of the viewing panel 82. Horizontal and vertical axis X and Y respectively are shown to define coordinate axis of a two dimensional cartesion coordinate system. The location of each pixel comprising the image is represented by an X, Y coordinate. The center of the viewing screen 82 is the origin, coordinate (0, 0). With the table in the horizontal position ($\theta_T = 0°$), a representative pixel 130 is shown at coordinate location (x, y). To effect rotation of the overall image, the address of each data byte in the display memory 100 is modified by a function of $\theta_T$ to derive new data addresses representative of new memory locations. This remapping of the data byte locations effects a corresponding relocation of the pixel elements on the display screen. For example, as the table tilts to an intermediate Trendelenburg position the coordinate location of pixel 130 is remapped to new location (x', y') shown as pixel 130'. The position of pixel 130 is thereby rotated an amount equal to $\theta_T$ but in a direction opposite $\theta_T$. In a like manner, as the table tilts to an intermediate vertical position, the coordinate location of pixel 130 is remapped to a new location (x", y") shown as pixel 130".

The motion sensing means (not shown) is operatively coupled in a known manner to the tilting table. The motion sensing means monitors the orientation of the table and operates to produce substantially instantaneous signals 120 (FIG. 6) corresponding to the direction and extent of the table tilt i.e. $\theta_T$. The motion sensing means can be an optical encoder, linear potentiometer, sine/cosine potentiometer or resolver. Microprocessor 106 receives the signals 120 and assigns via an algorithm described below, an address location in the display memory 100 for each byte comprising the image. As the table tilts, the signals 120 change and the bytes in display memory 100 are moved to the new, updated location. The display memory 100 is accessed via control logic 102 which outputs the data to the display 104 in the remapped form. Since the display memory 100 is preferably a dynamic RAM, accessing the memory automatically refreshes the memory with new remapped digital data. Thus the remapping process occurs continuously as the table tilt signals change. By rearranging the coordinate location of each pixel in this manner, the entire image will in effect be rotated the same magnitude but in an opposite direction to the table tilt. This in effect maintains proper image orientation to one viewing the image irrespective of the direction or extent of table tilt.

FIG. 10 represents a flow chart summarizing the steps used to calculate new coordinates of each pixel to rotate the image $\theta$ degrees. The steps defined in FIG. 10 occur via microprocessor 106. Table tilt input 120 is received from the motion sensing means (not shown). The signals provided by the sensing means represent $\theta_T$. Step 122 operates on input 120 to determine the sine and cosine value of $\theta_T$. Current memory addresses of the data bytes 124 designated as coordinates X, Y are received from the display memory 100. Step 126 calculates new coordinate positions X', Y' in accordance with the following formulae;

$$X' = (X \cdot \cos \theta) - (Y \cdot \sin \theta) \qquad (1)$$

$$Y' = (X \cdot \sin \theta) + (Y \cdot \cos \theta) \qquad (2)$$

The fractional part of X' and Y' should be kept to two decimal places pending roundoff per step 128.

Step 128 defines the conditions under which X' and Y' are rounded to integer values. The conditions are as follows;

a. Take the absolute value of X' and Y'. If the fractional part is greater than or equal to 0.50, then increment by one, the absolute value of the integer part and then change the sign so that it confirms to the sign of the coordinate before the absolute value was taken. For example, if a coordinate was calculated to be $-5.75$, then the coordinate would be rounded to $-6$.

b. If the fractional part is less than 0.50, then take the coordinate to be the integer part only and then change the sign so that it confirms to the sign of the coordinate before the absolute value was taken. For example, if the coordinate was calculated to be 220.33, then the coordinate would be rounded to 220.

Step 130 defines the new coordinate values X' and Y' which represent new locations within the display memory 100 where the byte will be stored. When the display memory 100 is again accessed via control logic 102, the pixel locations will be remapped and the displayed image will be reoriented to maintain the spatial relationship of the image to one viewing the image.

It is to be understood that the description of this embodiment of the invention is intended to be illustrative, rather than exhaustive. Those of ordinary skill in the relevant art will be able to make certain additions, deletions and modifications to the described embodiment of the invention, without departing from the spirit or scope of the invention, as described in the following claims.

We claim:

1. A stationary imaging apparatus comprising:
   (a) a main support structure;
   (b) a patient support member;
   (c) means for tiltably mounting the patient support member to the main support structure about a first axis;
   (d) a source for propagating penetrative radiation along a path extending through the patient support member said source being mounted at a location spaced from a first side of said support member;
   (e) a sensor, including means to produce electrical signals representing radiation when incident thereon, mounted for imposition in the radiation path at a location spaced from a second side of said support member; and
   (f) display means responsive to said signals for producing an image representing the incident radiation said display means being electrically coupled to the sensor and mounted for tilting movement with the patient support member
   (g) means to cause rotation of said image in response to said tilting motion of the patient support member, in order to maintain a substantially constant predetermined spatial orientation of said image.

2. The apparatus of claim 1 further comprising means for mounting the display for pivotal motion about a second axis orthogonal to said first axis.

3. The apparatus of claim 2 further comprising means for mounting the display for pivotal motion about a third axis, said third axis being orthogonal to said first and second axes.

4. A radiographic system for producing an image of a subject, said system comprising:
   (a) a base;
   (b) an x-ray table with a table surface defining a longitudinal dimension;
   (c) pivot means coupled between said table and said base for mounting said table for tilting motion about a first horizontal axis substantially perpendicular to said longitudinal dimension of said table;
   (d) a source of X-radiation coupled to the x-ray table for propagating X-radiation along a path;
   (e) a detector means including means to produce signals representing X-radiation when incident thereon, said detector mounted to the x-ray table for imposition in the X-radiation path and spaced from the source to accommodate a subject therebetween;
   (f) display means coupled to the detector and responsive to said radiation representing signals for producing an image representing incident radiation, said display means mounted to the x-ray table for tilting motion with said table; and
   (g) image rotation means coupled to said display means and responsive to tilting motion of said table to effect rotation of said image in a direction opposite the tilting direction of said table in order to maintain a predetermined image orientation.

5. The system of claim 4 wherein said display means comprises a screen selected from the group consisting of Plasma Gas Discharge screens, Electroluminescent screens, Liquid Crystal screens and cathode ray tubes.

6. The radiographic system of claim 4 wherein the display mounting means further comprises:
   (a) means for mounting the display for pivotal motion about a second horizontal axis substantially orthogonal to said first horizontal axis, and
   (b) means for mounting the display for pivotal motion about a vertical axis substantially orthogonal to said first and second horizontal axes.

7. The radiographic system of claim 4 wherein said image rotation means comprises:
   (a) a motion sensing means connected to the table for generating a position signal which is a function of the direction and extend of the table tilting motion;
   (b) a display memory coupled to the detector means and the display means, said memory comprising an array of data storage locations for storing X-radiation representing signals;
   (c) circuitry coupled to the display memory and responsive to the position signal generated by the motion sensing means, said circuitry for
      (i) arranging the radiation representing electrical signals stored in the array into a first mapping;
      (ii) rearranging the radiation representing electrical signals stored in the array to a second mapping in response to changes in the position signals; and
   (d) control logic for repeatedly accessing the display memory to transmit said radiation representing signals to the display.

8. A medical diagnostic system for producing an image of a pattern of penetrative radiation emergent from a subject under examination, said system comprising:
   (a) a main support structure;
   (b) means to support the subject under examination;
   (c) means for mounting the subject support means to the main support structure for pivotal motion about a substantially horizontal axis;
   (d) means for generating a beam of penetrative radiation along a path directed at the subject under examination;
   (e) a radiation sensor mounted for alignment in the radiation path in spaced relationship from the source at a location opposite the support to accommodate the subject under examination therebetween, said sensor being able to convert the pattern of radiation emerging from the subject to corresponding image representing electrical signals; and
   (f) display means for converting the image representing electrical signals to a visual image, said display means mounted to the subject support means for rotational movement about said horizontal axis in unison with pivotal motion of said subject support
   (g) image orientation means coupled to the radiation sensor and the display means for maintaining a substantially constant predetermined spatial orientation of the visual image during said pivotal motion of the support and rotative motions of said display means.

9. The system of claim 8 wherein the image orientation means is comprised of:
   (a) motion sensing means coupled to the subject support means for generating a position signal representative of the direction and extent of pivotal motion;
   (b) display memory for storing the image representing electrical signals in a plurality of memory locations;

(c) processor means responsive to the position signal and coupled to the display memory for allocating image representing electrical signals among display memory locations said allocated locations being a function of the direction and extent of pivotal motion; and (d) control logic for periodically accessing the display memory for transmitting the image representing electrical signals to the display.

10. A method of maintaining the predetermined spatial orientation of an image of a subject produced on a display and utilizing a subject support member mounted for pivotal motion to a main support frame, a source for propagating penetrative radiation along a path directed toward said support member, a sensor spaced from said source and interposable in said path on a side of said support member opposite said source, said sensor including means to produce electrical signals representing radiation when incident on said sensor and a display mounted to the support member for movement in unison with the support member and responsive to the radiation representing electrical signals, said method comprising the steps of:

(a) actuating the source of penetrative radiation to irradiate a subject under examination;

(b) sensing radiation emergent from the subject under examination;

(c) producing electrical signals representing sensed radiation;

(d) displaying the radiation representing signals as a visual image;

(e) causing pivotal motion of the support member so as to cause like motion of the display; and (f) rotating the displayed image as a function of the direction and extend of pivotal motion.

11. The method of claim 10 wherein the step of rotating the displayed image further comprises the steps of:

(a) storing the radiation representing electrical signals in a plurality of first memory locations;

(b) determining the direction and extent of the pivotal motion of the patient support member; and (c) relocating the memory locations of the radiation representing signals to a plurality of second memory locations.

12. The method of claim 11 wherein the step of relocating the memory locations of the radiation representing electrical signals comprises the steps of:

(a) identifying the coordinate location of each of the plurality of first memory locations;

(b) determining an angle representative of the position of the patient support member and the sine and cosine values of said angle; and (c) determining the coordinate location of each of the plurality of second memory locations by applying the sine and cosine values of said angle to the coordinate location of each of the plurality of first memory locations in accordance with the formulae;

$$X' = (X \cdot \cos \theta) - (Y \cdot \sin \theta) \text{ and}$$

$$Y' = (X \cdot \sin \theta) + (Y \cdot \cos \theta)$$

where X and Y represent the coordinate location of the first memory locations, $\theta$ represents the angle of the position of the patient support member and X' and Y' represent the coordinate location of the second memory locations.

13. The method of claim 10 wherein the step of rotating the displayed image further comprises the steps of:

(a) assigning memory addresses to the radiation representing electrical signals;

(b) storing the signals in first memory locations corresponding to the addresses;

(c) producing a signal indicating the position of the patient support member;

(d) redefining the memory addresses of the radiation representing electrical signals as a function of the position indicating signal;

(e) storing the signals in second memory locations corresponding to the redefined memory addresses; and (f) periodically accessing the memory locations and transmitting the radiation representing electrical signals to the display.

14. A medical diagnostic imaging system for producing an image of a subject, said system comprising:

(a) a source for propagating penetrative radiation along a path;

(b) means to support the subject in the radiation path;

(c) motion means to generate pivotal motion of the support means;

(d) a sensor including means for producing signals representing penetrative radiation when incident thereon, said sensor mounted for alignment in the radiation path at a spaced location opposite the source;

(e) image display means responsive to said radiation representing signals for producing an image in a predetermined spatial orientation corresponding to said signals, said display means mounted for movement with said support means; and (f) image orientation means coupled to the display means for generating pivotal motion of said image in response to pivotal motion of said support means so as to maintain said predetermined spatial orientation.

15. A medical diagnostic system for producing an image of a pattern of penetrative radiation emergent from a subject, said system comprising:

(a) a table including a top for supporting a subject under examination;

(b) means to generate pivotal motion of said table about a first axis;

(c) a source for propagating penetrative radiation along a path directed toward a subject under examination, said source mounted at a location spaced from a first side of said table top;

(d) an imaging means mounted for imposition in the radiation path at a location spaced from a second side of said table top, said imaging means including means to produce electrical signals representing a pattern of radiation when incident thereon;

(e) a display mounted for pivotal movement with said table and positioned proximate said imaging means, said display responsive to the radiation representing electrical signals for producing a visual image of the pattern of radiation in a predetermine spatial orientation; and (f) image orientation means coupled to said display and responsive to pivotal motion of said table for substantially maintaining the predetermined spatial orientation of said visual image during pivotal motion of said table.

16. The system of claim 15 wherein said display is mounted integrally with the imaging means.

17. The system of claim 15 further comprising means for mounting said display for pivotal motion about a second axis.

18. The system of claim 17 further comprising means for mounting said display for pivotal motion about a third axis, said third axis being orthogonal the second axis.

19. A method of medical diagnostic examination, utilizing a system including a patient support table mounted for pivotal motion about a substantially horizontal axis, a source for propagating penetrative radiation along a path, an imaging system mounted to the table and interposable in said radiation path for converting radiation incident thereon to radiation representing electrical signals, a panel for controlling system operation and a monitor mounted to the imaging system and responsive to the radiation representing electrical signal for producing an image of internal structure of a subject, said monitor and said imaging system movable in unison with said table, said method comprising the steps of:

(a) placing a patient to be examined on the patient support table, said placement being made within the operator's field of view;

(b) positioning said imaging system in the path of penetrative radiation on a side of said patient opposite said source thereby positioning said monitor, said control panel and said imaging system within the operator's field of view;

(c) propagating penetrative radiation into the patient's body by actuation of said system by use of said control panel;

(d) causing said system to produce a visual image of internal patient body structure on said monitor in response to radiation incident on said imaging system;

(e) causing pivotal motion of said patient support table thereby causing like motion of said monitor; and (f) maintaining said image in a predetermined spatial orientation relative the operator's field of view during pivotal motion of the said patient support table.

* * * * *